United States Patent
Brigden et al.

(10) Patent No.: US 11,020,826 B2
(45) Date of Patent: Jun. 1, 2021

(54) REPAIR SYSTEM AND METHOD FOR REPAIRING CAVITATION DAMAGE FOR A FUEL PUMP

(71) Applicant: General Electric Company, Schenectady, NY (US)

(72) Inventors: Jesse A. Brigden, Erie, PA (US); Neal E. Britton, Titusville, PA (US); Harold David Harter, Venetia, PA (US); James Schreiner, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 82 days.

(21) Appl. No.: 16/271,277

(22) Filed: Feb. 8, 2019

(65) Prior Publication Data

US 2020/0254573 A1    Aug. 13, 2020

(51) Int. Cl.
  *B23P 6/00*    (2006.01)
  *B23K 26/211*    (2014.01)

(52) U.S. Cl.
  CPC .............. *B23P 6/00* (2013.01); *B23K 26/211* (2015.10)

(58) Field of Classification Search
  CPC .. B23K 26/211; B23K 2103/05; B23K 26/34; F02M 59/44
  See application file for complete search history.

(56) References Cited

U.S. PATENT DOCUMENTS

| | | | |
|---|---|---|---|
| 4,860,302 A | 8/1989 | Janes | |
| 5,515,394 A | 5/1996 | Zhang | |
| 5,619,522 A | 4/1997 | Dube | |
| 5,625,657 A | 4/1997 | Gallacher | |
| 5,654,014 A | 8/1997 | Castellucci et al. | |
| 5,735,044 A | 4/1998 | Ferrigno et al. | |
| 5,928,534 A | 7/1999 | Flis et al. | |
| 6,227,819 B1 | 5/2001 | Gettel et al. | |
| 2005/0152426 A1 | 7/2005 | Dell'Acqua et al. | |
| 2008/0107549 A1 | 5/2008 | Crary et al. | |
| 2013/0270233 A1* | 10/2013 | Gu | B23K 26/20 219/121.64 |
| 2014/0169393 A1* | 6/2014 | Thyzel | H01S 3/0407 372/35 |
| 2016/0031105 A1* | 2/2016 | Koebke | B26D 1/015 83/36 |
| 2019/0032836 A1* | 1/2019 | Sprague | F16L 55/18 |
| 2020/0009685 A1* | 1/2020 | Kumazawa | B23K 26/24 |

* cited by examiner

*Primary Examiner* — John C Hong
(74) *Attorney, Agent, or Firm* — Josef L. Hoffmann; The Small Patent Law Group, LLC (57) ABSTRACT

A method for repairing damage to a fuel pump assembly of a locomotive is provided that includes identifying a void within a fluid cavity of a fuel pump assembly. After identifying the void within the fluid cavity of the fuel pump assembly, the void is cleaned with a cleaning product, and a filler material is inserted within the void. Then the filler material is laser welded to repair the void. After being laser welded, the fluid cavity of the fuel pump assembly is honed.

20 Claims, 6 Drawing Sheets

REPAIR SYSTEM AND METHOD FOR REPAIRING CAVITATION DAMAGE FOR A FUEL PUMP

FIELD

The inventive subject matter described herein relates to a method of repairing cavitation damage.

BACKGROUND

Fuel pumps are utilized in association with internal combustion engines of motorized vehicles such as trains, automobiles, motorcycles, and the like. Such fuel pumps are coupled to a fuel tank of the engine to convey fuel from the fuel tank to the engine cylinders. Fuel pumps may be mechanical, electrical, the like and regulate the pressure at which the fuel is supplied to the fuel injection system that is essential to efficiently operate the engine.

During operation a fuel pump experiences severe pressure dynamics during the end of a fuel injection event, causing pressure bubbles to collapse and send pressure waves into the element material of the fuel pump. The resulting energy transfer causes material erosion within a fluid cavity of the fuel pump. This cavitation erosion damage changes the flow output of the pump, which in turn alters performance characteristics of the fuel pump, such as pressure, flow rate, and the like. This can result in undesired performance, including increased engine emissions.

BRIEF DESCRIPTION

In one example of the inventive subject matter described herein, a method is provided that includes identifying a void within an inner wall of a fluid cavity of a fuel pump assembly. The method also includes pulsing a laser beam on the void to repair the void.

In another example of the inventive subject matter described herein, a system is provided that includes a cutting assembly configured to remove damage from an inner wall of a fluid cavity and a laser welding device configured to emit and direct a laser beam into the fuel cavity to reshape the inner wall of the fuel cavity. The system also includes a honing device configured to remove excess filler in the fuel cavity.

In yet another example of the inventive subject matter described herein, a method is provided that includes identifying damage within a fluid cavity of a fuel pump assembly, and removing debris from within the fluid cavity of the fuel pump assembly to form at least one void within an inner wall of the fluid cavity. The method also includes pulsing a laser beam on the void during a first period to clean the void, and pulsing the laser beam on the void during a second period to reshape and repair the void.

BRIEF DESCRIPTION OF THE DRAWINGS

Reference is now made briefly to the accompanying drawings, in which.

DETAILED DESCRIPTION

A method of repairing cavitation damage in a fluid cavity of a fuel pump assembly is provided. The cavitation damage is created by forces resulting from repeated cycles of pressurized fluid flowing through the fluid cavity. The cavitation damage is caused by deformation of the inner wall of the fluid cavity from these forces. The damage includes voids or openings formed in the inner wall of the fluid cavity and protrusions jutting out into the fluid cavity. The method includes identifying the damage, including the voids, and removing any protrusions or damaged portions within the fluid cavity. The voids are then cleaned, and a laser welder is utilized to reform and repair the voids. Optionally, a filler material may be applied into the voids to facilitate repair. After the needed number of passes with the laser beam of the laser welder on the voids to reform and repair all voids, the cavity is honed to ensure correct reformation of the fluid cavity.

Figure 1:
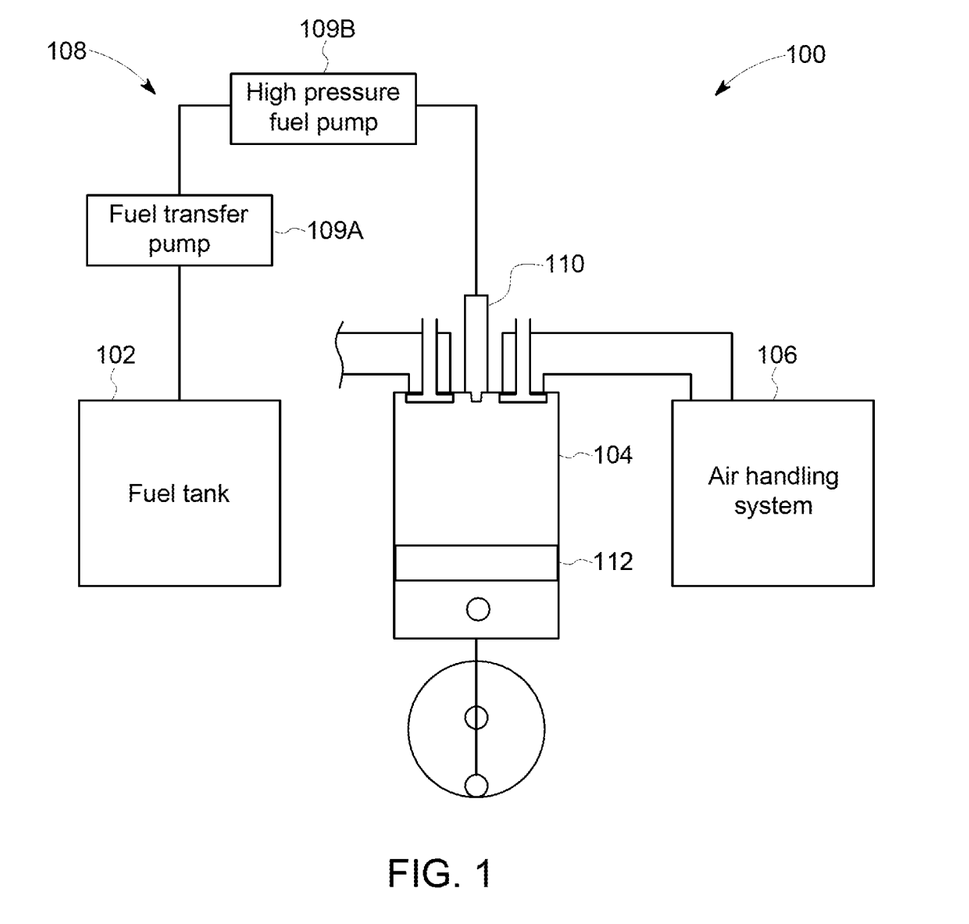
FIG. 1 is a schematic block diagram of an engine system in accordance with one embodiment of the inventive subject matter.

FIG. 1 is a schematic diagram of an engine system 100 that includes a fuel tank 102, at least one engine cylinder 104, and an air handling system 106. In one example the engine system 100 is utilized to propel a locomotive. Fuel from the fuel tank 102 is pumped by a pump assembly 108, which in one example includes a fuel transfer pump 109A and a high pressure fuel pump 109B, under pressure from the fuel tank 102 to fuel injectors 110. The fuel tank 102 is of any size or shape as desired for the spatial requirements of a vehicle utilizing the engine system 100. The fuel includes any combustible substance, including gasoline, diesel fuel, additives, and the like. The fuel is then injected into the engine cylinder 104 and compressed by a piston 112 within the engine cylinder 104 until the fuel explodes to drive the cylinders from the explosion and creating exhaust. The exhaust is then expelled from the engine cylinder 104 to the air handling system 106 and expelled into the environment.

The engine cylinders 104 include the pistons 112 that operate according to multiple engine cycles to generate power, such as the multi-stroke (e.g., four) engine cycle. Alternatively, the engine may operate with a different number of strokes such as a two-stroke engine.

Figure 2:
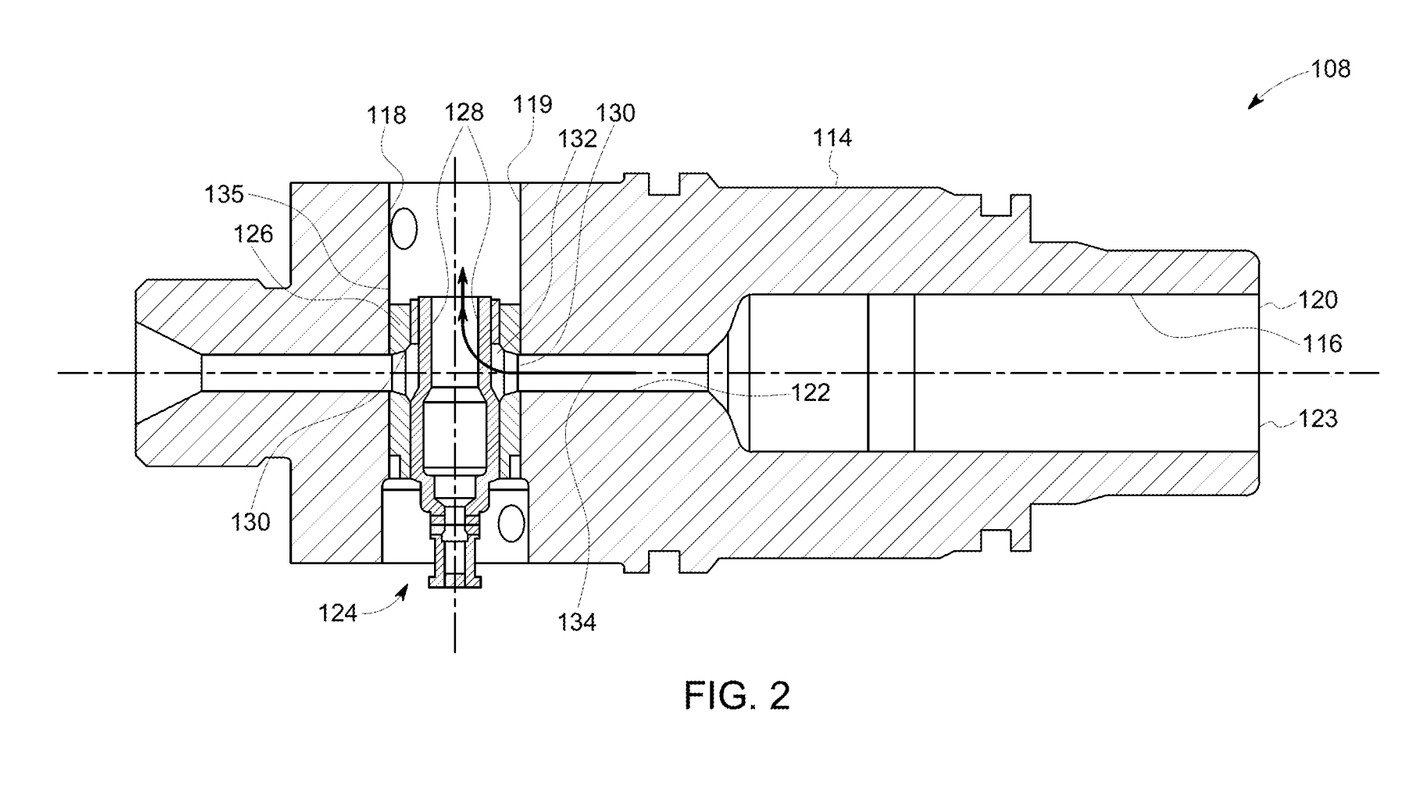
FIG. 2 is a sectional view of a fuel pump assembly in accordance with one embodiment of the inventive subject matter.

FIG. 2 illustrates the fuel pump assembly 108. The fuel pump assembly 108 in one example is fluidly connected to the fuel tank and is within the fluid communication pathway between the fuel tank 102 and engine cylinders. The fuel pump assembly 108 includes a housing 114, a first fluid cavity 116 disposed through the housing 114, and a second fluid cavity 118 with an inner wall 119 disposed through the housing 114 transverse to the first fluid cavity 116.

Each of the first and second fluid cavities 116 and 118 in one example are generally cylindrical in shape and created by forming a bore within the housing 114. In one example, each of the first and second fluid cavities 116 and 118 are within fluid conduits disposed through the housing 114. The first fluid cavity 116 includes a fluid input 120 that receives fuel within the tank 102 to be conveyed through the fuel pump assembly 108. The first fluid cavity 116 terminates in a throttling passageway 122 that has a diameter that is less than the diameter of the first fluid cavity 116. The throttling passageway 122 extends from adjacent the fluid input 120, through the second fluid cavity 118, and terminates on the other side of the second fluid cavity 118 within the housing 114.

A valve element 124 is disposed within the second fluid cavity 118 and includes a housing 126 and a moveable member 128 disposed within the housing 126. The housing 126 includes openings 130 disposed therethrough to provide a communication path between the second fluid cavity 118 and the throttling passageway 122. The moveable member 128 includes inlet passageway 132 therethrough. Thus, when the movable member 128 is in a first position, a fluid flow pathway 134 is formed for the throttling passageway 122 through and into the second fluid cavity 118.

Once the pressurized fuel flows into the valve element 124, the moveable member 128 moves to a second position that effectively blocks the fluid flow pathway from the throttling passageway 122 to the second fluid cavity 118. In the second position, the valve element has conveyed the pressurized fuel from the first fluid cavity 116 through the valve element 124 and out of an outlet port 135 to the fuel injectors 110. The fuel injectors 110 of the engine system 100 thus receive pressurized fuel from the fuel tank 102 and injects fuel into the engine cylinders 104. In one embodiment, the fuel injectors 110 are mounted in the intake ports of an intake manifold. Alternatively, the fuel injectors 110 direct the fuel directly into the engine cylinders 104. Alternatively, the fuel injectors 110 are mounted in the cylinder head next to an inlet valve of the engine cylinders 104.

Upon completion of the injection event by the fuel injectors 110, severe pressure dynamics occur within the second fluid cavity 118, causing pressure bubbles to collapse and send pressure waves in the element material of the sidewall that defines the second fluid cavity 118. Over time, these continuous pressure waves provide an energy transfer that results in erosion to the sidewall material of the inner wall 119 defining the second fluid cavity 118, resulting in voids 136 or pits within the inner wall 119. Voids 136 are small openings or indentions within the surface of a material.

Figure 3:
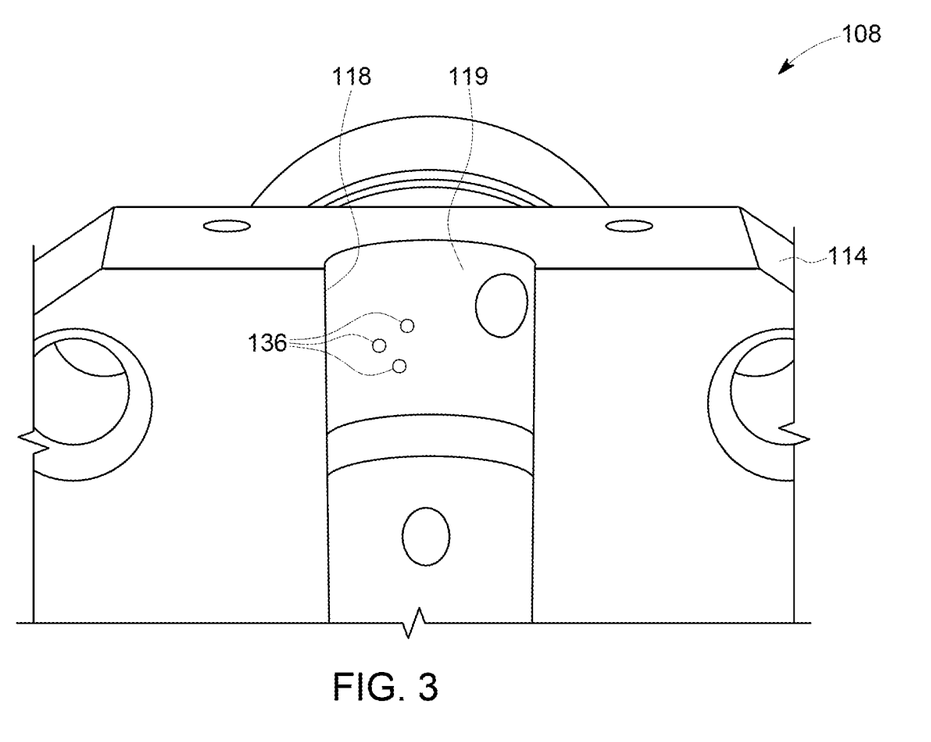
FIG. 3 is a cutaway sectional view of a fluid cavity in accordance with one embodiment of the inventive subject matter.

FIG. 3 illustrates a cutaway sectional view of the second fluid cavity 118. This illustration shows numerous voids 136 formed within the inner wall 119 of the second fluid cavity 118. The voids 136 are of any size or shape and include numerous surfaces. The voids 136 can be located at any position or place in the inner wall 119 of the second fluid cavity 118. Typically, the voids are located directly adjacent to the end of the fluid cavity. The voids 136 may be grouped or clustered, or alternatively spaced apart. In one example, voids connect with one another.

Figure 4:
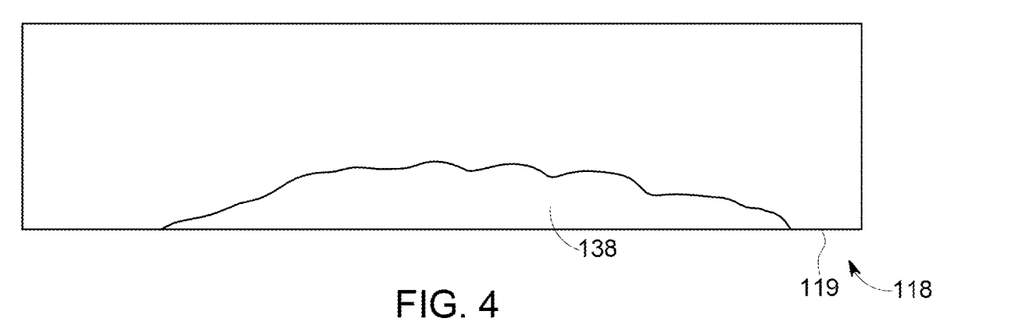
FIG. 4 is a sectional view of a void in accordance with one embodiment of the inventive subject matter.
Figure 5:
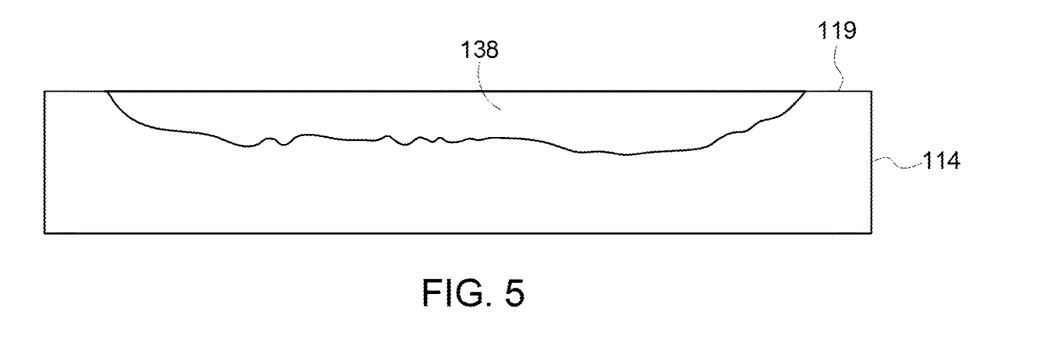
FIG. 5 is a sectional view of a void in accordance with one embodiment of the inventive subject matter.

FIGS. 4 and 5 illustrate filler 138 that is placed in a void (FIG. 3) after a repair has been performed in accordance with the methods described herein. In one example embodiment, FIG. 4 illustrates filler 138 that was placed in a void of the second fluid cavity 118 of the fuel pump assembly 108 of FIGS. 2 and 3 and FIG. 5 illustrates a filler 138 that is placed in another void of the second fluid cavity 118 of FIGS. 2 and 3. In one example, the filler 138 in the void 136 has been laser welded to bond to the housing 114.

Figure 6:
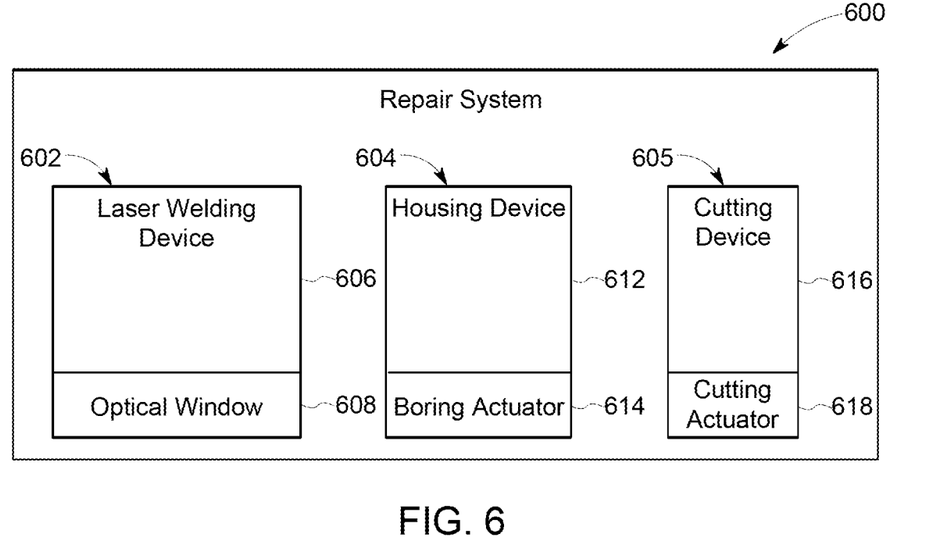
FIG. 6 is a schematic block diagram of a repair system in accordance with one embodiment of the inventive subject matter.

FIG. 6 illustrates a repair system 600 for repairing a fuel pump assembly. In one example embodiment, the fuel pump assembly being repaired is the fuel pump assembly 108 of FIGS. 1 and 2. The repair system 600 includes a laser welding device 602, a honing device 604, and a cutting assembly 605.

The laser welding device 602 includes a housing 606 with an optical window 608 through which the laser emits radiation. In one example embodiment, the housing 606 is portable such that the laser may be positioned as required to radiate welding regions of interest within a fuel cavity of a fuel pump assembly. Alternatively, the housing 606, optical window 608, or optical source (not shown) within the laser are moveable to control a laser beam emitted by the laser welding device 602. The laser beam emitted by the laser welding device is able to provide welding in confined spaces, permitting welding in a fluid cavity having a small diameter. In one example, the laser beam is able to provide welds in cavities that are less than an inch in diameter.

The laser welding device 602 includes a neodymium-doped yttrium aluminum (ND:Y3Al5O12) garnet laser (Nd|YAG laser) in one example. In one example embodiment, the laser emits radiation at wavelengths of approximately 1064 nm. In other example embodiments, the laser emits other low level power radiation in a range between 900 nm and 1200 nm that requires power in a range between 75 Watts and 150 Watts to emit. In other embodiments, the laser emits radiation in the visible spectrum. Alternatively, other lasers, including erbium-doped yttrium aluminum garnet lasers (Er|YAG lasers), other yttrium based lasers, titanium based lasers, thulium lasers, and the like are utilized. Each laser is able to be pulsed in order to apply a filler material on a void within a fluid cavity of a fuel pump assembly, or heat, deform, and repair voids in a fluid cavity of a fuel pump assembly.

The honing device 604 includes a housing 612 with a boring actuator 614 extending from the housing in one example. The boring actuator 614 may be a drill, a boring device, and the like that places a cylindrical bore within a material. The boring actuator 614 may be movable and replaceable. In particular, a first actuator may be provided that has a first diameter and a second actuator may be provided that has a second diameter allowing for the boring of different diameter bores within a material or fuel pump assembly.

The cutting device 605 includes a housing 616 with a cutting actuator 618 extending from the housing 616 in one example. The cutting actuator 618 may be a carbide cutter, and the like that is able to cut through and remove damaged materials within a cavity of a fuel pump assembly. The cutting actuator 614 may be removable and replaceable. In particular a first cutting actuator may be removed upon becoming dull or broken and replaced with a new or second cutting actuator.

Figure 7:
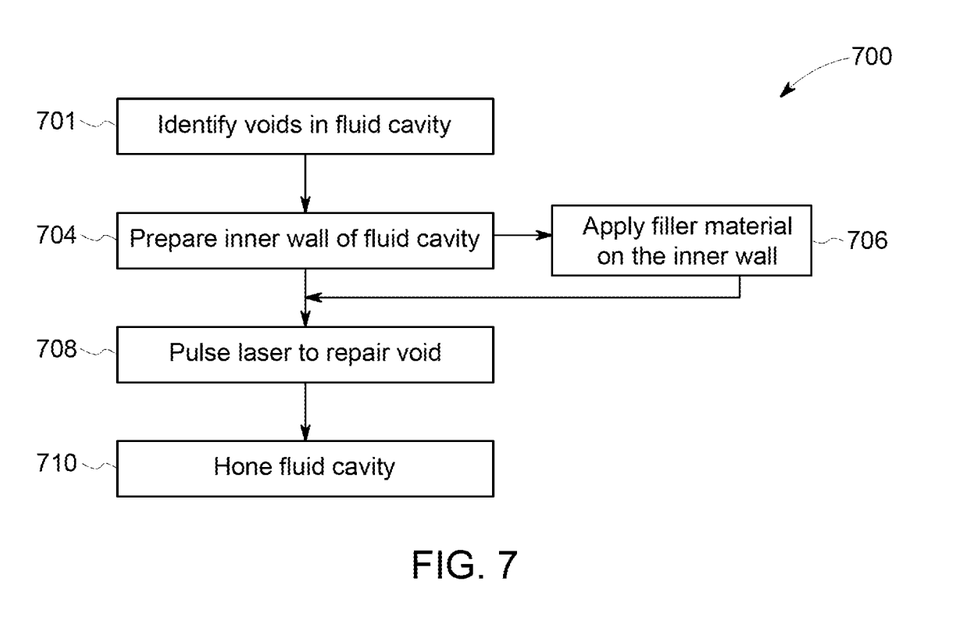
FIG. 7 is a block flow diagram in accordance with one embodiment of the inventive subject matter.

FIG. 7 illustrates a method 700 of repairing a fuel pump assembly. In one example embodiment the fuel pump assembly is the fuel pump assembly of 108 of FIGS. 1 and 2 and the voids being repaired include the voids 136 of FIG. 3 and/or voids illustrated in FIGS. 4 and 5. In yet another example the method is provided for repairing the fuel pump assembly of a locomotive.

At 701, voids within a fluid cavity are identified. In one example, the voids are detected and identified through a determination as a result of reduced fuel pump efficiency. In another example, the inner wall of the fluid cavity is inspected with imaging tools such as a probe, camera, photomicrograph device, infrared camera, or the like. In an example, the voids are the voids 136 of FIG. 3 and/or voids illustrated in FIGS. 4 and 5.

At 704, a laser is utilized to prepare the inner wall of the fluid cavity. In one example the fluid cavity is less than an inch in diameter. In one example a single pass of a laser beam is emitted and pulsed to irradiate each void within the inner wall of the fluid cavity. In other example embodiments, multiple laser beam passes are utilized for preparation of the voids, including for enhanced cleaning and preparation of the voids for filler material. In one example, the laser is the laser device 602 of FIG. 6. In another example embodiment, a Nd|YAG laser is utilized. In one example embodiment the laser emits radiation at wavelength of approximately 1064 nm. In other example embodiments the laser emits other low level power radiation in a range between 900 nm and 1200 nm that requires power in a range between 75 Watts and 150 Watts to emit. In other embodiments the laser emits radiation in the visible spectrum. Alternatively, other lasers, including Er|YAG lasers, other yttrium based lasers, titanium based lasers, thulium lasers, and the like are utilized. In one example the housing of the laser is portable allowing the laser beam to be pointed at the voids. In another example the housing of the laser is mechanically operated on a positioning device to direct the laser beam on the voids. In an example, the positioning device a robotic arm operated by a control system.

At 706, optionally, a filler material is applied on the inner wall within the fluid cavity and specifically, within the voids. In example embodiments, the filler material includes stainless steel, nickel alloys, or the like. In another example, the stainless steel material is 420 stainless steel filler and the laser is a YAG based laser. In one example embodiment, the pulsing of the radiation is provided at constant intervals, while in another example the pulsing of the radiation varies. In another example, the laser is within a housing that directs the pulsed laser onto the voids and moves the pulsed laser along the voids to provide the filling of the voids to restore the fluid cavity. As a result of the filling of the voids, the region where the filler material is applied within the fluid cavity by the pulsed laser welder is considered a welded region. Specifically, the energy of the laser beam causes the filler material to become part of the inner wall of the fluid cavity through the heating, or welding process.

At 708, optionally, instead of utilizing filler material, multiple passes of the pulsed laser are utilized to repair voids. In one example, at 704, the laser is pulsed for a first period of time while at 708 the laser is pulsed for a second period of time. In an example an interval of time is provided between the first period of time and second period of time where the laser does not emit pulsed light. In one example the first period of time is less than 5 seconds and the second period of time is also less than five seconds while the interval between the first period of time and second period of time is at least ten seconds. In alternative embodiments the interval between the first period of time and second period of time may be over a minute. In other embodiments, the laser is pulsed on the void for a third period of time with a second interval of time between the second period of time and the third period of time. Optionally, the first interval and second interval may be the same period. Specifically, by utilizing numerous, or more than one laser pass, the consistency of the material of the fluid cavity is altered to reform a surface that defines the fluid cavity. Such alteration smooths out voids and, in some cases, eliminates the voids from the fluid cavity. Thus, again, a welded region is provided, even when no filler material is utilized.

At 710, the welded region is honed after excess weld material has been removed to provide a desired diameter of the fluid cavity. In one example embodiment, the desired diameter is the original diameter of the fluid cavity. Thus, in one example a honing device, or implement, is utilized that includes a tool that rotates to provide a cylindrical cavity with a smooth inner surface.

Figure 8:
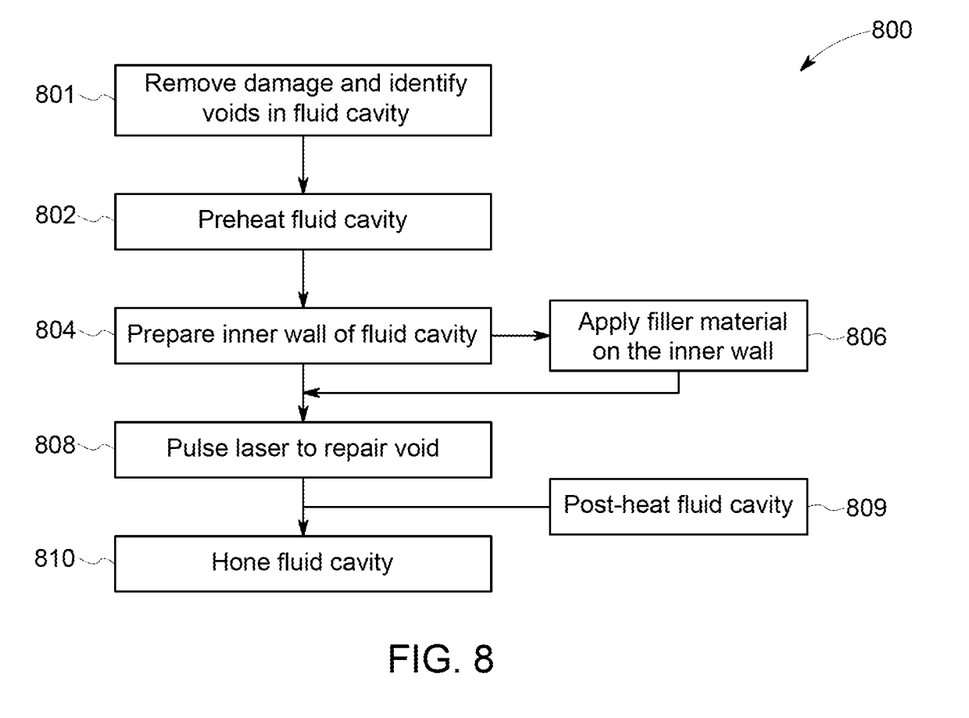
FIG. 8 is a block flow diagram in accordance with one embodiment of the inventive subject matter.

FIG. 8 illustrates a method 800 of repairing a fuel pump assembly. In one example embodiment the fuel pump assembly is the fuel pump assembly of 108 of FIGS. 1 and 2 and voids being repaired include the voids 136 of FIG. 3 and/or voids illustrated in FIGS. 4 and 5. In yet another example the method is provided for repairing the fuel pump assembly of a locomotive.

At 801, a damaged area, or damaged portion within a fuel pump assembly is removed and voids are identified. In one example embodiment the damaged portion is disposed within the fluid cavity such that before repair, the damaged portion must be removed. Consequently, during the process of removing the damaged portion at least one, if not a plurality of voids is formed within the inner wall of the fluid cavity. In one such example, a cutting assembly is utilized to cut away the damaged portion disposed within the fluid cavity. In one example, the cutting assembly is cutting assembly 605 of FIG. 6. In another example, the cutting assembly includes a carbide cutter to remove the damage. Consequently, the entire damaged portion is removed resulting in voids within the inner wall of the fluid cavity that then may be identified and repaired utilizing the provided methodology. In one example, the voids are detected and identified through a determination as a result of reduced fuel pump efficiency. In another example a test is preformed to determine the existence of voids. In yet another example, the inner wall of the fluid cavity is inspected with imaging tools such as a probe, photomicrograph device, camera, infrared camera, laser based measuring probe, or the like. In an example, the voids are the voids 136 of FIG. 3 and/or voids illustrated in FIGS. 4-5. Therefore, even in situations in which more severe damage is provided within the fluid cavity that is greatly impacting performance of the fuel pump assembly, the present methodology may be utilized to provide a repair within having a completely replace the fuel pump assembly. Thus, expense is saved.

At 802, the fluid cavity is pre-heated prior to utilizing the laser. In one example this temperature is not to exceed 180° C. The fluid cavity is preheated through any heating method. In one example the fluid cavity is pre-heated to up to 180° C. In yet another example, the fluid cavity is pre-heated to a temperature in a range between 170° C. and 190° C. By preheating the fluid cavity, the effectiveness on the laser weld is improved to result in a more robust repair.

At 804, a laser is utilized to prepare the inner wall of the fluid cavity. In one example a single pass of a laser beam is emitted and pulsed to irradiate the voids within the inner wall of the fluid cavity. In other example embodiments, multiple laser beam passes are utilized for preparation of the voids, including for enhanced cleaning and preparation of the voids for filler material. In one example, the laser is the laser device 602 of FIG. 6. In another example embodiment, a Nd|YAG laser is utilized. In one example embodiment the laser emits radiation at wavelength of approximately 1064 nm. In other example embodiments the laser emits other low level power radiation in a range between 900 nm and 1200 nm that requires power in a range between 75 Watts and 500 Watts to emit. In other embodiments the laser emits radiation in the visible spectrum. Alternatively, other lasers, including Er|YAG lasers, other yttrium based lasers, titanium based lasers, thulium lasers, and the like are utilized. In one example the housing of the laser is portable allowing the laser beam to be pointed at the voids. In another example the housing of the laser is mechanically operated on a positioning device to direct the laser beam on the voids. In an example, the positioning device a robotic arm operated by a control system.

At 806, optionally, a filler material is applied with in the voids of the inner wall of the fluid cavity. In one example, a stainless steel material is applied to the voids utilizing a pulsed laser. In one example, the stainless steel material is 420 stainless steel filler and the laser is a YAG based laser. In one example embodiment, the pulsing of the radiation is provided at constant intervals, while in another example the pulsing of the radiation varies. In another example, the laser is within a housing that directs the pulsed laser onto the voids and moves the pulsed laser along the voids to providing the filling of the voids to restore the inner wall of the fluid cavity. As a result of the filling of the voids, the region where the filler material is applied in the voids of the inner wall within the fluid cavity by the pulsed laser welder is a welded region. Specifically, the energy of the laser beam causes the filler material to become part of the inner wall of the fluid cavity through the heating, or welding process.

At 808, optionally, instead of utilizing filler material, multiple passes of the pulsed laser are utilized to repair voids. In one example, at 804 the laser is pulsed for a first period of time while at 808 the laser is pulsed for a second period of time. In an example an interval of time is provided between the first period of time and second period of time where the laser does not emit pulsed light. In one example the first period of time is less than 5 seconds and the second period of time is also less than five seconds while the interval between the first period of time and second period of time is at least ten seconds. In alternative embodiments the interval between the first period of time and second period of time may be over a minute. In other embodiments, the laser is pulsed on the void for a third period of time with a second interval of time between the second period of time and the third period of time. Optionally, the first interval and second interval may be the same period. Specifically, by utilizing numerous, or more than one laser pass, the consistency of the material of the fluid cavity is altered to reform a surface that defines the fluid cavity. Such alteration smooths out voids and, in some cases, eliminates the voids from the fluid cavity. Thus, again, a welded region is provided, even when no filler material is utilized.

At 809, after the fluid cavity is laser welded, the fluid cavity is post-heated. The fluid cavity is post-heated through any heating method. In one example the fluid cavity is post-heated up to 180° C. In yet another example, the fluid cavity is post-heated to a temperature in a range between 170° C. and 190° C. By post-heating the fluid cavity the laser weld is more robust and improved.

At 810, the welded region is honed to provide a desired diameter of the fluid cavity. In one example embodiment, the desired diameter is the original diameter of the fluid cavity. Thus, in one example a honing device is utilized that includes a bit that rotates to provide a cylindrical cavity with a smooth inner surface. In this manner, in example embodiments when filler material is utilized, by honing the fluid cavity, excess filler material is removed to ensure the efficiencies of the fuel pump assembly are not reduced as a result of the repair process.

While steps 801, 802, 804, 806, 808, 809, and 810 are provided, each is optional. Specifically, in one example, only laser welding at 808 is provided and material is not removed from the fluid cavity before the weld, the fluid cavity is not pre-heated, the inner wall of the fluid cavity is not prepared with a laser, filler material is not applied in voids of the fluid cavity, the laser weld is not post-heated, nor is the fluid cavity honed.

Similarly, in another example a fluid cavity may be prepped with a single pass of the laser, a filler material such as stainless steel 420 may be applied, and the laser weld may be provided to repair the fluid cavity. In such an example, pre-heating and post-heating are not provided, reducing equipment use, energy consumption, and repair time.

In another example repair, a carbide cutter is utilized to remove damaged materials from the fluid cavity, a filler material is applied with the laser welder, and excess weld is removed through machining, such as honing the fluid cavity to the correct diameter. In yet another example repair, a carbide cutter is utilized to remove damaged materials from the fluid cavity, the fluid cavity is pre-heated to 400° F., a filler material is laser welded to fill voids in the fluid cavity, and excess weld is removed through machining, such as honing the fluid cavity to the correct diameter. Thus, each individual repair may be modified depending on the desired hardness of the fluid cavity after the repair, the tools, power, and time to be utilized in making the repair, and the cost of the repair.

Thus, provided are methods 700, 800 that allow for the repair of voids within a fluid cavity of a fuel pump assembly that are various shapes and sizes. These include microscopically sized voids in fuel cavities that are less than an inch in diameter that effect the performance of the fuel pump, but have not previously been able to be repaired or accounted for. Such voids can be approximately 0.015" in maximum diameter while approximately 0.140" in length, but optionally may be larger or smaller. Specifically, by using a laser welder, the laser beam is able to reach tight areas and confines such as the inner wall of the fluid cavity of the fuel pump assembly and to repair the voids to improve performance of the fuel pump assembly.

Thus, provided in one example is a method that includes identifying a void within an inner wall of a fluid cavity of a fuel pump assembly, and pulsing a laser beam on the void to repair the void. Optionally, the method also includes filling the void with a filler material to prepare the void prior to pulsing the laser beam on the void. Optionally, the filler material is a stainless steel material.

In one example, the method can also include cleaning the inner wall of the fluid cavity of the fuel pump assembly before filling the void with a filler material. Optionally, the cleaning the inner wall of the fluid cavity of the fuel pump assembly includes placing acetone on the void. In an example, before cleaning the inner wall of the fluid cavity of the fuel pump assembly, the method also includes removing debris from within the fluid cavity. Alternatively, debris is removed from within the fluid cavity by cutting a damaged portion of the fluid cavity.

Optionally, the method also includes drilling the fluid cavity with a honing device after pulsing the laser beam on the void.

In another example, the method includes pulsing the laser beam on the void to repair the void includes pulsing the laser beam during a first period to prepare the void and pulsing the laser beam after the first period during a second period to repair the void. Optionally, an interval is provided between the first period and the second period.

In one example, the laser beam is emitted by a yttrium aluminum garnet based laser. Optionally, the laser beam has a wavelength in a range between 900 nm and 1200 nm.

Alternatively, the laser beam has a wavelength of 1064 nm. Also, in one example, the yttrium aluminum garnet based laser has a power source of between 75 Watts and 500 Watts In another example, a system is provided that includes a cutting assembly configured to remove damage from an inner wall of a fuel cavity. The system also includes a laser welding device configured to emit and direct a laser beam into the fuel cavity to reshape the inner wall of the fuel cavity, and a honing implement configured to remove excess filler in the fuel cavity. Optionally, the fuel cavity is less than an inch in diameter. In one example, the laser welding device includes a yttrium aluminum garnet based laser.

Additionally, provided is a method that includes identifying damage in a fluid cavity of a fuel pump assembly and removing debris from within the fluid cavity of the fuel pump assembly to form at least one void within an inner wall of the fluid cavity. The method also includes, pulsing a laser beam on the void during a first period to clean the void, and pulsing the laser beam on the void during a second period to reshape and repair the void.

Optionally, removing debris from within the fluid cavity includes cutting a damaged portion of the fluid cavity. In one example, no filler material is utilized to repair the void.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method for repairing damage to a fuel pump assembly, the method comprising:
   identifying a void within an inner wall of a fluid cavity of the fuel pump assembly of a vehicle;
   directing a laser beam into the fuel cavity to reshape the inner wall of the fuel cavity; and
   pulsing the laser beam on the void to repair the void.

2. The method of claim 1, further comprising:
   applying a filler material in the void to prepare the void prior to pulsing the laser beam on the void.

3. The method of claim 2, wherein the filler material is a stainless steel material.

4. The method of claim 2, further comprising:
   before filling the void with a filler material, cleaning the inner wall of the fluid cavity of the fuel pump assembly.

5. The method of claim 4, wherein cleaning the inner wall of the fluid cavity of the fuel pump assembly includes placing acetone on the void.

6. The method of claim 4, further comprising:
   before cleaning the inner wall of the fluid cavity of the fuel pump assembly, removing debris from within the fluid cavity.

7. The method of claim 6, wherein removing debris from within the fluid cavity includes cutting a damaged portion of the fluid cavity.

8. The method of claim 4, further comprising:
   honing the fluid cavity with a honing device after pulsing the laser beam on the void.

9. The method of claim 1, wherein pulsing the laser beam on the void to repair the void includes pulsing the laser beam during a first period to prepare the void and pulsing the laser beam after the first period during a second period to repair the void.

10. The method of claim 9, wherein an interval is provided between the first period and the second period.

11. The method of claim 1, wherein the laser beam is emitted by a yttrium aluminum garnet based laser.

12. The method of claim 11, wherein the laser beam has a wavelength in a range between 900 nm and 1200 nm.

13. The method of claim 12, wherein the laser beam has a wavelength of 1064 nm.

14. The method of claim 11, wherein the yttrium aluminum garnet based laser has a power source of between 75 Watts and 150 Watts.

15. A system for repairing damage in a fuel pump assembly of a vehicle comprising:
   a cutting assembly configured to remove damage from an inner wall of a fuel cavity;
   a laser welding device configured to emit and direct a laser beam into the fuel cavity to reshape the inner wall of the fuel cavity; and
   a honing device configured to remove excess filler in the fuel cavity.

16. The system of claim 15, wherein the fuel cavity is less than an inch in diameter.

17. The system of claim 15, wherein the laser welding device includes a yttrium aluminum garnet based laser.

18. A method for repairing damage to a fuel pump assembly of a vehicle, the method comprising:
   identifying damage in a fluid cavity of the fuel pump assembly of the vehicle;
   removing debris from within the fluid cavity of the fuel pump assembly to form at least one void within an inner wall of the fluid cavity;
   directing a laser beam into the fuel cavity to reshape the inner wall of the fuel cavity;
   pulsing the laser beam on the at least one void during a first period to clean the void; and
   pulsing the laser beam on the void during a second period to reshape and repair the inner wall of the fluid cavity.

19. The method of claim 18, wherein removing debris from within the fluid cavity includes cutting a damaged portion of the fluid cavity.

20. The method of claim 18, wherein no filler material is utilized to repair the fluid cavity.

\* \* \* \* \*